US012658800B2

(12) United States Patent
Zhang et al.

(10) Patent No.: US 12,658,800 B2
(45) Date of Patent: Jun. 16, 2026

(54) SWITCHING POWER SUPPLY CIRCUIT AND ELECTRONIC DEVICE

(71) Applicant: Huawei Technologies Co., Ltd., Shenzhen (CN)

(72) Inventors: Wenlin Zhang, Shenzhen (CN); Yue Chen, Shenzhen (CN); Yi Wang, Chengdu (CN); Qiang Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 18/667,335

(22) Filed: May 17, 2024

(65) Prior Publication Data

US 2024/0305200 A1     Sep. 12, 2024

Related U.S. Application Data

(63) Continuation of application No. PCT/CN2021/131869, filed on Nov. 19, 2021.

(51) Int. Cl.
   *H02M 3/158*     (2006.01)
   *H02M 1/088*     (2006.01)
(52) U.S. Cl.
   CPC ........... *H02M 3/158* (2013.01); *H02M 1/088* (2013.01)

(58) Field of Classification Search
   CPC .............................. H02M 3/158; H02M 1/088
   USPC ........................................................ 323/282
   See application file for complete search history.

(56) References Cited

U.S. PATENT DOCUMENTS 10,651,736 B1 *   5/2020   Lazaro ................ H02M 7/4837
10,833,589 B2 *  11/2020   Sharma ................ H03K 17/687

OTHER PUBLICATIONS

Gerhard Schrom, et al., "High-Speed ZVS-ZCS Soft-Switching CMOS Bridge Drivers for a DC-DC Fully Integrated Voltage Regulator (FIVR) operating at 100-320MHz on 22nm process node", Devices Development Group, Intel Corporation, Hillsboro, OR, USA, IEEE, Mar. 17-21, 2019, pp. 2263-2267.

* cited by examiner

*Primary Examiner* — Yemane Mehari
(74) *Attorney, Agent, or Firm* — Conley Rose, P.C.

(57)     ABSTRACT
A switching power supply circuit includes a power transistor circuit, including a plurality of power transistors coupled in series between a power supply end and a ground, where a first electrode of a first power transistor in the plurality of power transistors is coupled to the power supply end by using a second power transistor in the plurality of power transistors, and a second electrode of the first power transistor is coupled to the ground by using a third power transistor in the plurality of power transistors; a drive circuit, configured to drive the second power transistor and the third power transistor; and a first transistor, where both a gate and a first electrode of the first transistor are coupled to a gate of the third power transistor, and a second electrode of the first transistor is coupled to the ground by using a first switch.

20 Claims, 10 Drawing Sheets

100

100

SWITCHING POWER SUPPLY CIRCUIT AND ELECTRONIC DEVICE

CROSS-REFERENCE TO RELATED APPLICATIONS

This is a continuation of International Patent Application No. PCT/CN2021/131869 filed on Nov. 19, 2021, the disclosure of which is hereby incorporated by reference in its entirety.

TECHNICAL FIELD

Embodiments of this disclosure relate to the field of integrated circuit technologies, and in particular, to a switching power supply circuit and an electronic device.

BACKGROUND

With development of electronic technologies, performance of a mobile device is increasingly improved, and more users prefer to use the mobile device to complete various things. This imposes a higher requirement on a battery life of an electronic device. To prolong the battery life of the electronic device and reduce an energy loss of the electronic device, the industry proposes that a cascode transistor having a low voltage and low power consumption is used as a switching transistor of a switching power supply circuit, to reduce the energy loss of the switching power supply circuit and improve power conversion efficiency.

However, when the cascode type transistor is used as a power transistor of the switching power supply circuit, a plurality of lower power transistors are usually connected in series between an output node of a coupled inductor in the switching power supply circuit and a ground. Within a dead time of switching between an upper power transistor and a lower power transistor, due to existence of a body diode on the lower power transistor, charges stored in the inductor are discharged through the ground and the body diode on the lower power transistor. As a result, a gate-source voltage of a lower power transistor that is not connected to the ground in the plurality of lower power transistors is excessively high, and exceeds a withstand voltage limit of the power transistor. Consequently, the power transistor is broken down and damaged, and then reliability of the switching power supply circuit is reduced.

SUMMARY

A switching power supply circuit and an electronic device that are provided in this disclosure can ensure that a gate-source voltage or a gate-drain voltage of each power transistor is within a withstand voltage limit range in a working process of the switching power supply circuit, thereby improving reliability of the switching power supply circuit.

To achieve the foregoing objective, the following technical solutions are used in this disclosure.

According to a first aspect, an embodiment of this disclosure provides a switching power supply circuit. The switching power supply circuit includes a power transistor circuit, including a plurality of power transistors coupled in series between a power supply end and a ground, where a first electrode of a first power transistor (for example, a power transistor M3 shown in FIG. 3) of the plurality of power transistors is coupled to the power supply end by using a second power transistor (for example, a power transistor M1 shown in FIG. 3) of the plurality of power transistors, and a second electrode of the first power transistor is coupled to the ground by using a third power transistor (for example, a power transistor M4 shown in FIG. 3) of the plurality of power transistors; a drive circuit, configured to: receive a pulse width modulation pulse-width modulation (PWM) signal, generate a drive signal based on the PWM signal to drive the second power transistor and the third power transistor, and maintain a gate of the first power transistor at a preset voltage; a first transistor (for example, a transistor N1 shown in FIG. 3), where both a gate and a first electrode of the first transistor are coupled to a gate of the third power transistor, and a second electrode of the first transistor is coupled to the ground by using a first switch (for example, a transistor N2 shown in FIG. 3); and a control circuit, configured to: receive the PWM signal, and generate a first control signal based on the PWM signal to control the first switch.

According to the switching power supply circuit provided in this embodiment of this disclosure, the control circuit and the first transistor are disposed, so that a gate potential of the third power transistor may be set to a gate-drain voltage of the first transistor within a dead time of switching from turning on the third power transistor to turning on the second power transistor. The gate-drain voltage of the first transistor is less than or equal to a threshold voltage of the third power transistor. Therefore, the third power transistor can be kept in a slight on state, and charges stored in an inductor are transmitted through a conduction channel of the third power transistor. In comparison with another technology in which the charges stored in the inductor are transmitted through a body diode on the third power transistor within the dead time, a gate-source voltage and a gate-drain voltage of the first power transistor can be reduced. This avoids breakdown and damage of the first power transistor that are caused by an excessively high gate-source voltage and an excessively high gate-drain voltage of the first power transistor. In this way, the switching power supply circuit provided in this embodiment of this disclosure can improve the reliability of the switching power supply circuit.

Based on the first aspect, in a possible implementation, the switching power supply circuit further includes a second transistor (for example, a transistor N3 shown in FIG. 3). A gate of the second transistor is coupled to the second electrode of the first power transistor, a first electrode of the second transistor is coupled to the gate of the third power transistor, and a second electrode of the second transistor is coupled to the ground by using a second switch (for example, a transistor N4 shown in FIG. 3).

In this embodiment of this disclosure, the second switch and the first switch may be a same switch, or may be different switches. In a possible implementation, both the first switch and the second switch are transistors. In this embodiment of this disclosure, the second transistor is disposed, and the gate potential of the third power transistor may further be pulled down at a moment when the second power transistor is started to quickly cut off the third power transistor. This avoids damage of a power supply due to simultaneous turn-on of the second power transistor and the third power transistor.

Based on the first aspect, when the second switch and the first switch are different switches, the control circuit is further configured to control the second switch by using the first control signal.

The control circuit controls the second switch by using the first control signal, so that at the moment when the second power transistor is turned on, charges accumulated at the second electrode of the first power transistor may be discharged to the gate of the second transistor, to control the second transistor to be quickly turned on, and then the charges at the second electrode of the first power transistor are quickly discharged to the ground. Therefore, the third power transistor in a weak on state is quickly cut off, thereby avoiding breakdown and damage of a power transistor that are caused by punchthrough of the first power transistor to the third power transistor at the moment when the second power transistor is turned on, and improving the reliability of the switching power supply circuit.

Based on the first aspect, in a possible implementation, the switching power supply circuit further includes a selector (for example, a selector multiplexer (MUX) shown in FIG. 5), configured to selectively couple the gate of the first transistor to the gate of the third power transistor or the second electrode of the first power transistor. The selector is disposed, so that within the dead time of switching from turning on the third power transistor to turning on the second power transistor, the selector connects the gate of the first transistor to the gate of the third power transistor, to enable the third power transistor to be in a weak on state. At the moment when the second power transistor is turned on, the selector connects the gate of the first transistor to the second electrode of the first power transistor, to enable the third power transistor to be quickly cut off.

Based on the first aspect, in a possible implementation, the PWM signal includes a first PWM signal (for example, a PWMP signal shown in FIG. 7) used to control the second power transistor and a second PWM signal (for example, a PWMN signal shown in FIG. 7) used to control the third power transistor; and the control circuit includes a first flip-flop, where the first flip-flop is configured to generate the first control signal based on the first PWM signal and the second PWM signal.

Based on the first aspect, in a possible implementation, the switching power supply circuit further includes a third transistor (for example, a transistor N11 shown in FIG. 8); and a first electrode of the third transistor is coupled to the gate of the first power transistor, and a second electrode of the third transistor is coupled to the gate of the first transistor, where the third transistor and the first transistor are different types of transistors.

The third transistor is disposed, so that within a dead time of switching from turning on the second power transistor to turning on the third power transistor, the third transistor is kept in a slight on state. Therefore, the charges stored in the inductor are transmitted through a conduction channel of the third transistor, to reduce a gate-source voltage and a gate-drain voltage of the first transistor. This avoids breakdown and damage of the second transistor that are caused by an excessively high gate-source voltage and an excessively high gate-drain voltage of the second transistor. In this way, the switching power supply circuit provided in this embodiment of this disclosure can improve the reliability of the switching power supply circuit.

Based on the first aspect, in a possible implementation, the control circuit is further configured to generate a second control signal based on the PWM signal to control the third transistor.

Based on the first aspect, in a possible implementation, the control circuit further includes a second flip-flop. The second flip-flop is configured to generate the second control signal based on the first PWM signal and the second PWM signal.

Based on the first aspect, in a possible implementation, the switching power supply circuit further includes a first OR gate (for example, an OR gate A2 shown in FIG. 8), configured to generate a third control signal after performing an OR operation on the first control signal and the second control signal, to control the first switch.

Based on the first aspect, in a possible implementation, the switching power supply circuit further includes a second OR gate (for example, an OR gate A1 shown in FIG. 7 or an OR gate A3 shown in FIG. 10), configured to: perform an OR operation on at least one of the first control signal and the second control signal and the second PWM signal to generate the third control signal, and provide the third control signal to the drive circuit.

Based on the first aspect, in a possible implementation, the control circuit is specifically configured to: within the dead time of switching from turning on the third power transistor to turning on the second power transistor, control the first switch and the second switch to be turned on; and after the second power transistor is turned on, control the first switch and the second switch to be turned off.

Based on the first aspect, in a possible implementation, the control circuit is specifically configured to: within the dead time of switching from turning on the second power transistor to turning on the third power transistor, control the third transistor and the first switch to be turned on; and after the third power transistor is turned on, control the third transistor and the first switch to be turned off.

Based on the first aspect, in a possible implementation, the plurality of power transistors further include a fourth power transistor (for example, a power transistor M2 shown in FIG. 3). The first electrode of the first power transistor is coupled to the power supply end by using the second power transistor and the fourth power transistor. The drive circuit is further configured to maintain a gate of the fourth power transistor at the preset voltage.

Based on the first aspect, in a possible implementation, the switching power supply circuit further includes a processor, configured to generate the first PWM signal and the second PWM signal.

Based on the first aspect, in a possible implementation, the drive circuit includes a first inverter, a second inverter, a fourth transistor, and a fifth transistor. An input end of the first inverter is configured to receive the second PWM signal, and an input end of the second inverter is configured to receive the third control signal. An output end of the first inverter is coupled to a gate of the fourth transistor, and an output end of the second inverter is coupled to a gate of the fifth transistor. A source of the fourth transistor is coupled to the gate of the first power transistor, a drain of the fourth transistor is coupled to a drain of the fifth transistor, and a source of the fifth transistor is coupled to the ground. The fourth transistor is a p-channel metal-oxide semiconductor (PMOS) transistor, and the fifth transistor is an n-channel metal-oxide semiconductor (NMOS) transistor.

Based on the first aspect, in a possible implementation, the switching power supply circuit further includes an inductor and a capacitor. A first end of the inductor is coupled to the first electrode of the first power transistor, and a second end of the inductor is configured to couple a load to supply power to the load. A first electrode of the capacitor is coupled to the second end of the inductor, and a second electrode of the capacitor is coupled to the ground.

According to a second aspect, an embodiment of this disclosure provides an electronic device. The electronic device includes a load and the switching power supply circuit according to the first aspect. An output end of the switching power supply circuit is coupled to the load, to supply power to the load.

BRIEF DESCRIPTION OF DRAWINGS

To describe the technical solutions in embodiments of this disclosure more clearly, the following briefly introduces the accompanying drawings used in describing embodiments of this disclosure. It is clear that the accompanying drawings in the following description show merely some embodiments of this disclosure, and persons of ordinary skill in the art may still derive other drawings from these accompanying drawings without creative efforts.

DESCRIPTION OF EMBODIMENTS

The following clearly describes the technical solutions in embodiments of this disclosure with reference to the accompanying drawings in embodiments of this disclosure. It is clear that the described embodiments are some but not all of embodiments of this disclosure. All other embodiments obtained by persons of ordinary skill in the art based on embodiments of this disclosure without creative efforts shall fall within the protection scope of this disclosure.

"First", "second", or the like mentioned in this specification does not indicate any order, quantity, or importance, but is used only for distinguishing between different components. Likewise, terms such as "a/an" or "one" do not indicate a quantity limitation, but means existence of at least one.

In embodiments of this disclosure, terms such as "example" or "for example" are used to represent an example, an illustration, or a description. Any embodiment or design scheme described by "example" or "for example" in embodiments of this disclosure should not be construed as being more preferred or advantageous than another embodiment or design scheme. To be precise, the terms such as "example" or "for example" are intended to present a related concept in a specific manner. In the description of embodiments of this disclosure, unless otherwise specified, "a plurality of" means two or more. For example, a plurality of power transistors means two or more power transistors.

Figure 1A:
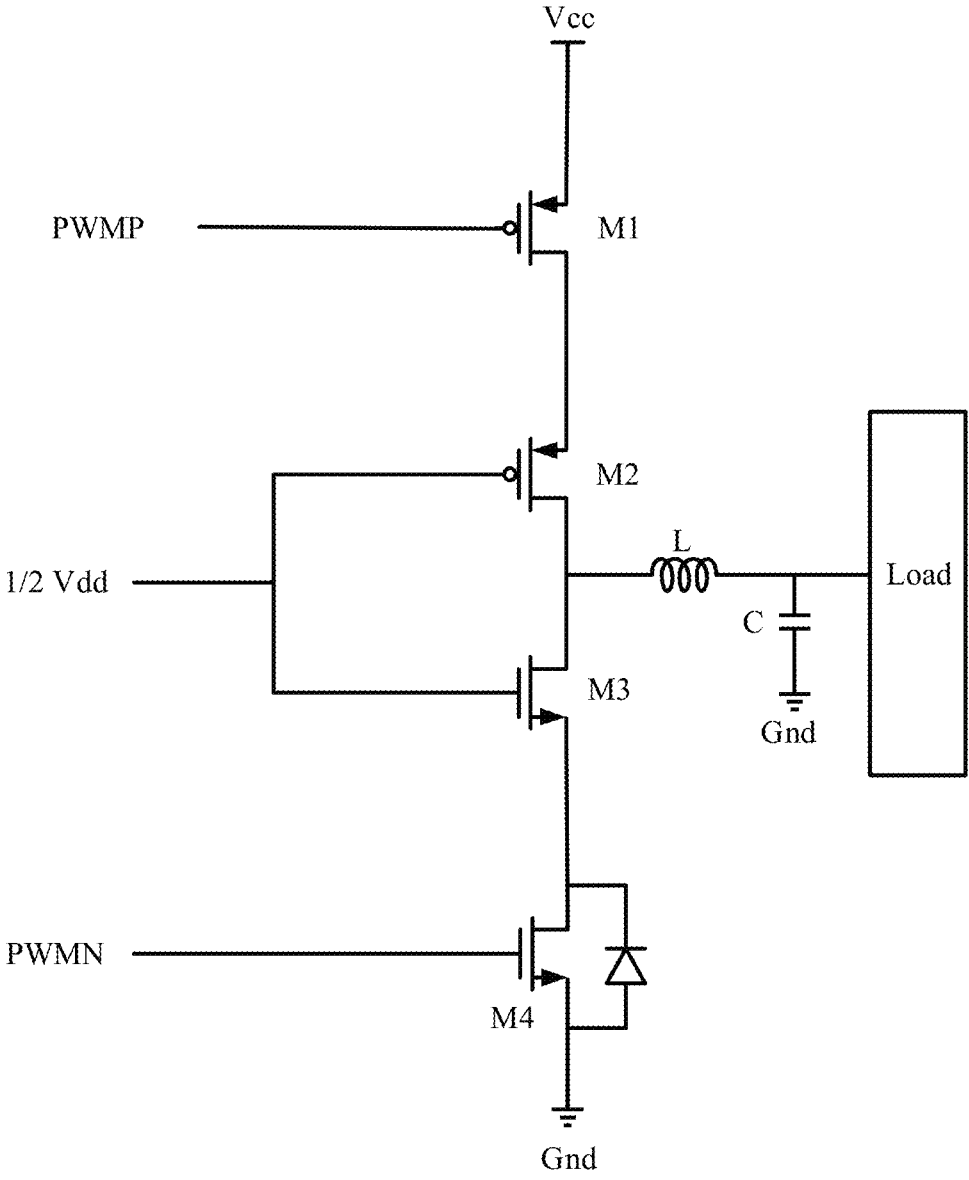
FIG. 1A is a schematic of a structure of a switching power supply circuit in another technology.
Figures 1B, 2:
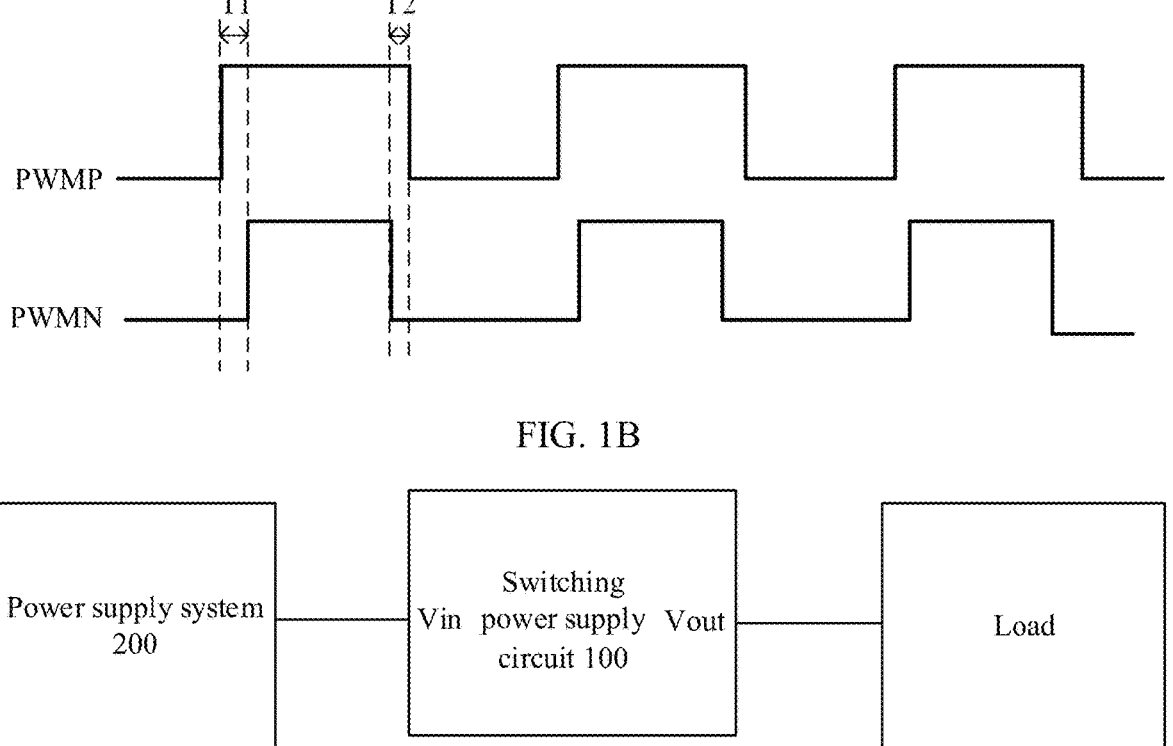
FIG. 1B shows timing for driving the switching power supply circuit shown in FIG. 1A to work.
FIG. 2 is a schematic of an application scenario of a switching power supply circuit according to an embodiment of this disclosure.

FIG. 1A is a schematic of a structure of a switching power supply circuit in another technology. In FIG. 1A, a low-voltage PMOS-type power transistor M1 and a low-voltage PMOS-type power transistor M2 are used as upper transistors to replace high-power PMOS transistors, and a low-voltage NMOS-type power transistor M4 and a low-voltage NMOS-type power transistor M3 are used as lower transistors to replace high-power NMOS transistors. A PWMP signal and a PWMN signal (as shown in FIG. 1B) alternately control turn-on and turn-off of the power transistor M1 and the power transistor M4, to output electric energy to a load. In addition, to prevent a power supply from being burnt due to simultaneous turn-on of the power transistor M1 and the power transistor M4, a dead time is usually set in a switching process of the power transistor M1 and the power transistor M4, for example, a time period T1 and a time period T2 shown in FIG. 1B. Within the dead time, both the power transistor M1 and the power transistor M4 are cut off. However, there is a body diode in the power transistor M4. Because a current on an inductor L does not change abruptly, within the dead time, a current loop is formed between the inductor L, a capacitor C, a ground Gnd, the body diode on the power transistor M4, and the power transistor M3. In this case, both a source voltage and a drain voltage of the power transistor M3 are a voltage drop Vf of a body diode of the power transistor M3. Therefore, both a gate-source voltage Vgs and a gate-drain voltage Vgd of the power transistor M3 are equal to 2/Vdd+Vf. The voltage usually exceeds a withstand voltage limit of the power transistor M3. Consequently, the power transistor M3 is broken down and damaged, and then reliability of the switching power supply circuit is reduced.

Figure 3:
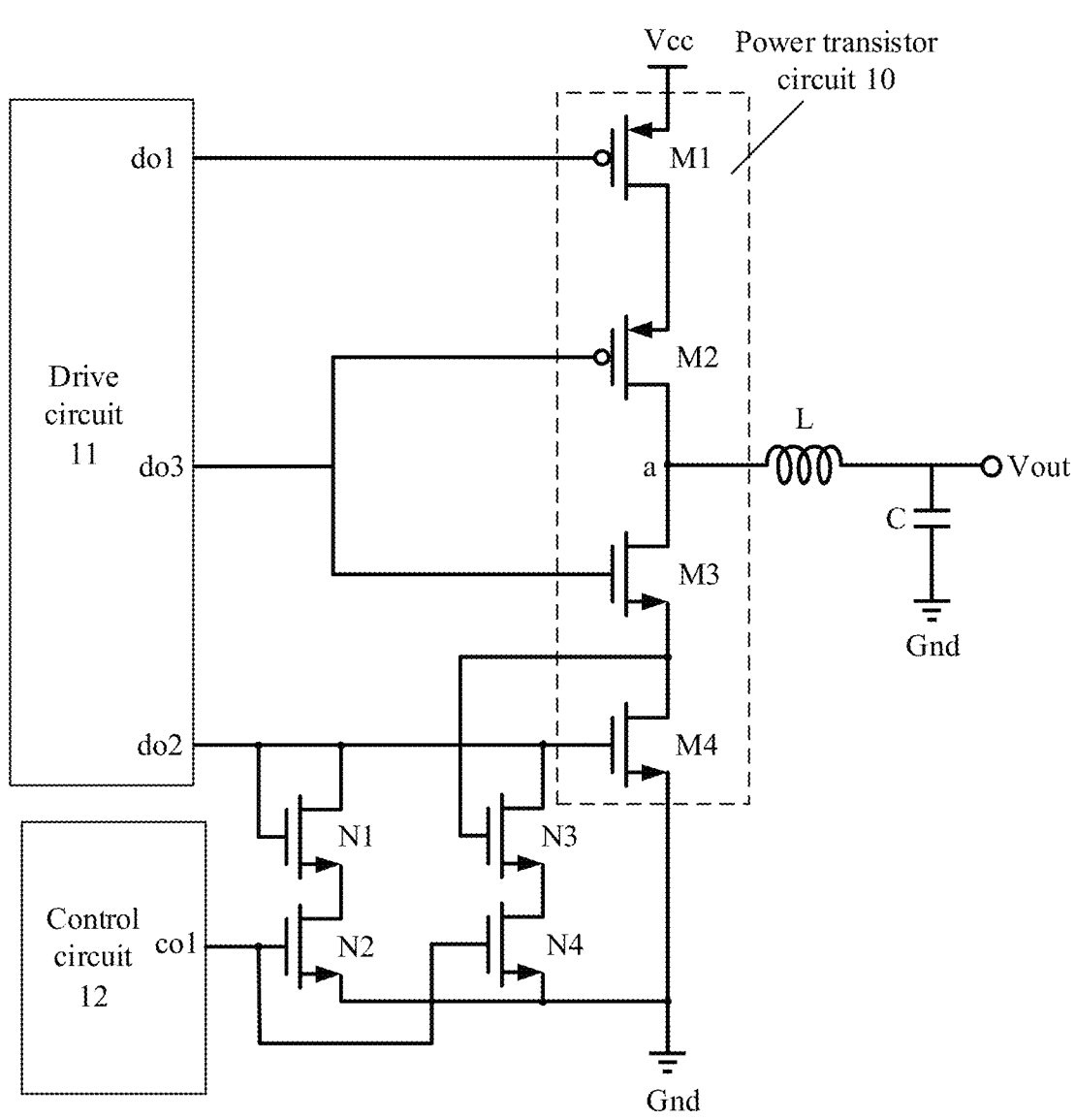
FIG. 3 is a schematic of a structure of a switching power supply circuit according to an embodiment of this disclosure.

According to the switching power supply circuit provided in this embodiment of this disclosure, a control circuit 12 and a transistor N1 that are shown in FIG. 3 are disposed, so that a gate potential of the power transistor M4 may be set to a gate-drain voltage of the transistor N1 within the dead time in the switching process of the power transistor M1 and the power transistor M4. The gate-drain voltage of the transistor N1 is less than or equal to a threshold voltage of the power transistor M4. Therefore, the power transistor M4 can be kept in a slight on state, and the current discharged by the inductor is transmitted through a conduction channel of the power transistor M4. In comparison with another technology in which the charges stored in the inductor are transmitted through the body diode on the power transistor M4 within the dead time, the gate-source voltage and the gate-drain voltage of the power transistor M3 can be reduced. This avoids breakdown and damage of the power transistor M3 that are caused by an excessively high gate-source voltage and an excessively high gate-drain voltage of the power transistor M3. In this way, the switching power supply circuit provided in this embodiment of this disclosure can improve the reliability of the switching power supply circuit. Further, a transistor N3 shown in FIG. 3 is disposed, so that the gate potential of the power transistor M4 may be pulled down at a moment when the power transistor M1 is started, to enable the power transistor M4 to be quickly cut off. This avoids damage of the power supply due to simultaneous turn-on of the power transistor M1 and the power transistor M4. With reference to embodiments shown in FIG. 2 to FIG. 10, the following describes in more detail an application scenario, a structure, and a working principle of the switching power supply circuit provided in this embodiment of this disclosure.

FIG. 2 is a schematic of an application scenario of a switching power supply circuit according to an embodiment of this disclosure. In the schematic of the application scenario shown in FIG. 2, a power supply system 200, a switching power supply circuit 100, and a load are included. The power supply system 200 is connected to an input port Vin of the switching power supply circuit 100, to provide electric energy for the switching power supply circuit 100. The power supply system 200 may be an active circuit, and generally includes a battery, an active device, and the like. The power supply system 200 may alternatively be a power supply transmission line of a power grid and an external power adapter. The switching power supply circuit 100 is connected to the power supply transmission line of the power grid by using the external power adapter, so that the power grid transmits electric energy to the switching power supply circuit 100 by using the power adapter. An output port Vout of the switching power supply circuit 100 is connected to the load, and is configured to transmit the electric energy provided by the power supply system 200 to the load, to provide the load with electric energy required for running. The switching power supply circuit 100 in this embodiment of this disclosure may be a direct current-direct current (DC-DC) conversion circuit, and includes but is not limited to a buck circuit, a boost circuit, and a buck-boost circuit. The load may include but is not limited to a battery, various processors that drive a terminal device to run, or other types of devices, such as a graphics processing unit (GPU), a central processing unit (CPU), an operation accelerator, or various digital circuits and analog circuits. Alternatively, the load may be any integrated circuit chip, and the integrated circuit chip includes but is not limited to an artificial intelligence chip, an image processing chip, and the like. The switching power supply circuit 200 provided in this embodiment of this disclosure may be disposed in an electronic device, and may be specifically a chip, a chip set, a circuit board or a component that is equipped with a chip or a chip set, or may be a module integrated in the electronic device, but is not intended to limit embodiments. The electronic device may be user equipment (UE), and includes but is not limited to a mobile phone, a wearable device, an electric toothbrush, a tablet computer, or the like.

Based on the application scenario shown in FIG. 2, still refer to FIG. 3. FIG. 3 is a schematic of a structure of the switching power supply circuit 100 according to an embodiment of this disclosure. In FIG. 3, the switching power supply circuit 100 includes a power transistor circuit 10, a drive circuit 11, the control circuit 12, and the transistor N1. The power transistor circuit 10 includes a plurality of power transistors, and the plurality of power transistors are connected in series between a power supply end Vcc and the ground Gnd. An output node a is disposed between two of the power transistors to couple an inductor-capacitor circuit, to supply power to a load. At least some of the plurality of power transistors are low-voltage power transistors. For example, as shown in FIG. 2, the power transistor M3 and the power transistor M4 are connected in series between the output node a and the ground Gnd, and the two power transistors may be low-voltage power transistors; and the power transistor M1 and the power transistor M2 are connected in series between the output node a and the power supply end Vcc, and the two power transistors may be low-voltage power transistors. It should be noted that, in an optional implementation, no power transistor M2 may be disposed between the output node a and the power supply end Vcc, and only one power transistor M1 may be disposed. In this case, the power transistor M1 may be a high-voltage power transistor. The following embodiments of this disclosure are described by using an example in which two low-voltage power transistors are disposed between the output node a and the ground Gnd, and two low-voltage power transistors are disposed between the output node a and the power supply end Vcc. As shown in FIG. 3, FIG. 3 schematically shows that four power transistors M1 to M4 are connected in series between the power supply end Vcc and the ground Gnd. In FIG. 3, a first electrode of the power transistor M1 is coupled to the power supply end Vcc, a second electrode of the power transistor M1 is coupled to a first electrode of the power transistor M2, a second electrode of the power transistor M2 is coupled to a first electrode of the power transistor M3, a second electrode of the power transistor M3 is coupled to a first electrode of the power transistor M4, and a second electrode of the power transistor M4 is coupled to the ground Gnd. The output node a is formed at a coupling point between the second electrode of the power transistor M2 and the first electrode of the power transistor M3. The power transistors M1 to M4 are all low-voltage transistors. In addition, the power transistor M1 and the power transistor M2 may be a same type of transistors, the power transistor M3 and the power transistor M4 are a same type of transistors, and the power transistor M1 and the power transistor M4 are different types of transistors. For example, the power transistor M1 and the power transistor M2 are PMOS-type transistors shown in FIG. 3, and the power transistor M3 and the power transistor M4 are NMOS-type transistors shown in FIG. 3. The first electrode of the power transistor M1 and the first electrode of the power transistor M2 are sources, and the second electrode of the power transistor M1 and the second electrode of the power transistor M2 are drains. The first electrode of the power transistor M3 and the first electrode of the power transistor M4 are drains, and the second electrode of the power transistor M3 and the second electrode of the power transistor M4 are sources. An output end do1 and an output end do2 of the drive circuit 11 are respectively coupled to a gate of the power transistor M1 and a gate of the power transistor M4. The drive circuit 11 may receive a PWM signal from another component (for example, a processor, a signal generator, or a controller), convert the received PWM signal into a drive signal, and supply the drive signal to the power transistor M1 to the power transistor M4. A timing waveform of the drive signal may be the same as that of the PWM signal, so that the power transistor M1 and the power transistor M4 may be controlled to be turned on and off alternately. In addition, an output end do3 of the drive circuit 11 is further coupled to a gate of the power transistor M2 and a gate of the power transistor M3, to control the gate of the power transistor M2 and the gate of the power transistor M3 to be maintained at a preset voltage, where the preset voltage is, for example, ½ Vcc. Both a gate and a first electrode of the transistor N1 are coupled to the gate of the power transistor M4, and a second electrode of the transistor N1 is coupled to the ground Gnd by using a switch. The switch can be considered as a variety of switches, and the switch shown in FIG. 3 is a transistor N2. A first electrode of the transistor N2 is coupled to the second electrode of the transistor N1, and a second electrode of the transistor N2 is coupled to the ground Gnd. FIG. 3 further schematically shows that both the transistor N1 and the transistor N2 are NMOS transistors. The first electrode of the transistor N1 and the first electrode of the transistor N2 are drains, and the second electrode of the transistor N1 and the second electrode of the transistor N2 are sources. An output end co1 of the control circuit 12 is coupled to a gate of the transistor N2. The control circuit 12 may also receive the foregoing PWM signal, and the control circuit 12 generates a control signal based on the PWM signal, to control the transistor N2 to be turned on or turned off.

In addition, FIG. 3 further shows an inductor L and a capacitor C. A first end of the inductor L is coupled to the output node a, and a second end of the inductor L is an output end Vout of the switching power supply circuit 100 to supply power to the load; and the capacitor C is coupled between the second end of the inductor L and the ground Gnd.

Figure 4:
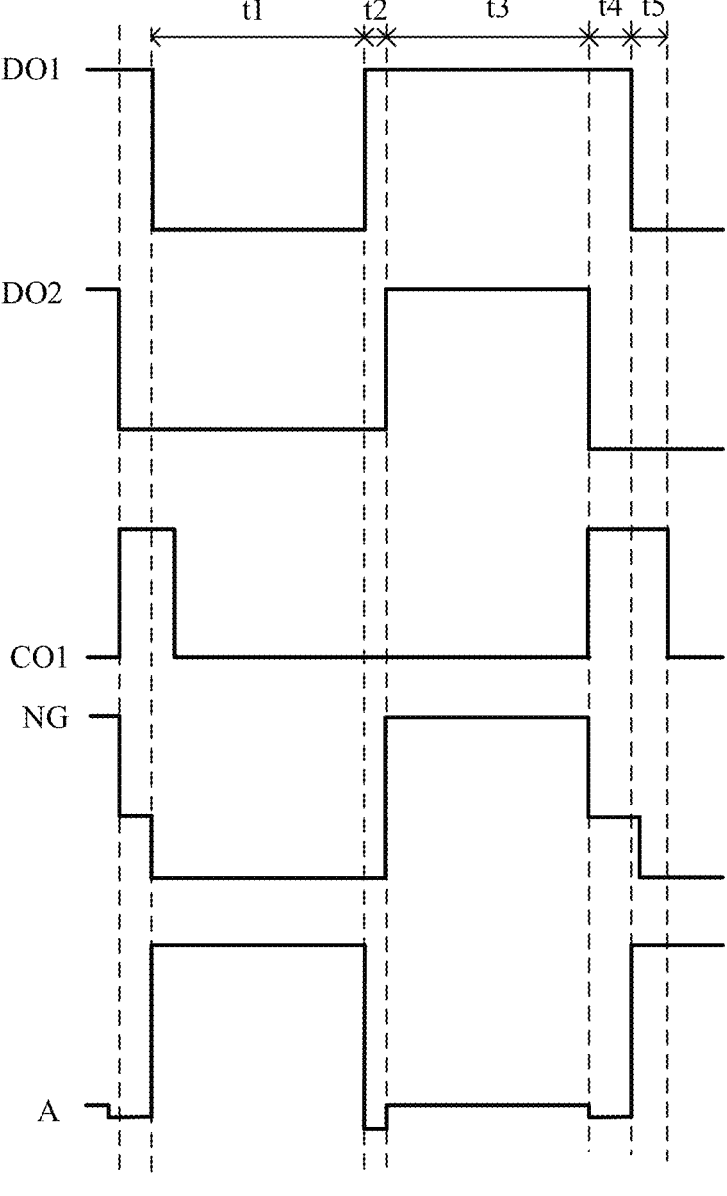
FIG. 4 is a diagram of timing for driving the switching power supply circuit shown in FIG. 3 according to an embodiment of this disclosure.

Based on the structure of the switching power supply circuit 100 shown in FIG. 3, the following describes in detail a working principle of the switching power supply circuit 100 provided in this embodiment of this disclosure with reference to a drive timing shown in FIG. 4. In FIG. 4, DO1 is a drive signal output by the output end do1 of the drive circuit 11 (namely, a signal for controlling the power transistor M1 to be turned on or turned off), DO2 is a drive signal output by the output end do2 of the drive circuit 11 (namely, a signal for controlling the power transistor M4 to be turned on or turned off), CO1 is a control signal output by the output end co1 of the control circuit 12, NG is a voltage signal of the gate of the power transistor M4, and A is a voltage signal of the output node a. In a working process of the switching power supply circuit 100, a signal output by the output end do3 of the drive circuit 11 remains unchanged at ½ Vcc. That is, both the gate of the power transistor M2 and the gate of the power transistor M3 remain unchanged at ½ Vcc.

In a time period t1, both the output end do1 and the output end do2 of the drive circuit 11 output a low-level signal, and the control signal output by the output end co1 of the control circuit 12 is converted from a high-level signal to a low-level signal. In this case, the power transistor M1 and the power transistor M2 are turned on, the power transistor M3 and the power transistor M4 are turned off, and the transistor N2 changes from an on state to an off state. Electric energy received by the power supply end Vcc is transmitted to the inductor L by using the power transistor M1 and the power transistor M2, to supply power to the load by using the inductor L.

In a time period t2, the output end do1 of the drive circuit 11 outputs a high-level signal, the output end do2 of the drive circuit 11 outputs a low-level signal, and the output end co1 of the control circuit 12 outputs a low-level signal. In this case, the power transistor M1 to the power transistor M4 are all turned off, and the transistor N2 is turned off. That is, the time period t2 is a dead time of switching from turning on the power transistor M1 to turning on the power transistor M4. The dead time is set to prevent the power transistor M1 to the power transistor M4 from being simultaneously turned on in a state switching process of each transistor. In the time period t2, the drive circuit 11, the transistor N1, and transistor N2 do not work.

In a time period t3, the output end do1 of the drive circuit 11 outputs a high-level signal, the output end do2 of the drive circuit 11 outputs a high-level signal, and the output end co1 of the control circuit 12 outputs a low-level signal. In this case, the power transistor M1 and the power transistor M2 are turned off, the power transistor M3 and the power transistor M4 are turned on, and the transistor N2 is turned off. Charges stored by the inductor L and the capacitor C in the time period t1 form a closed loop by using the ground Gnd, the power transistor M3, and the power transistor M4, to supply power to the load. In the time period t3, the drive circuit 11, the transistor N1, and the transistor N2 do not work.

In a time period t4, the output end do1 of the drive circuit 11 outputs a high-level signal, and the output end do2 of the drive circuit 11 outputs a low-level signal. When the output end do2 of the drive circuit 11 outputs the low-level signal, the output end co1 of the control circuit 12 outputs a high-level signal. In this case, the power transistor M1 and the power transistor M2 are turned off, the power transistor M3 is turned on, the transistor N2 is turned on, and a source of the transistor N1 is connected to the ground Gnd by using the transistor N2. Because both the gate and a drain of the transistor N1 are connected to the gate of the power transistor M4, in this case, the gate of the power transistor M4 is clamped to a gate-source voltage Vgs of the transistor N1. That is, in this case, the gate potential of the power transistor M4 is Vgs higher than a source potential. Therefore, the power transistor M4 enters a weak on state. Charges on the inductor L and the capacitor C form a closed loop between the ground Gnd, the conduction channel of the weakly conductive power transistor M4, and the power transistor M3. In this case, the gate-source voltage and the gate-drain voltage of the power transistor M3 are a sum of ½ Vcc and a source-drain voltage of the power transistor M4. When the power transistor M4 is weakly conductive, the source-drain voltage (for example, 0.2 V) is less than a voltage (for example, 0.7 V) of the body diode between the source and the drain in the power transistor M4. Therefore, in this embodiment of this disclosure, the transistor N1, the switch (the transistor N2 in FIG. 3) that is configured to connect the transistor N1 to the ground Gnd or disconnect the transistor N1 from the ground Gnd, and the control circuit 12 that controls the switch to be turned on or turned off are disposed, so that in the time period t4, namely, a dead time of switching from turning on the power transistor M4 to turning on the power transistor M1, the charges discharged by the inductor L and the capacitor C may be prevented from flowing to a source and a drain of the power transistor M3 through the body diode on the power transistor M4. This avoids breakdown and damage of the power transistor M3 that are caused by an excessively high gate-source voltage and an excessively high gate-drain voltage of the power transistor M3. In this way, the reliability of the switching power supply circuit 100 is improved.

In a time period t5, the output end do1 of the drive circuit 11 outputs a low-level signal, and the output end do2 of the drive circuit 11 outputs a low-level signal. After the output end do1 of the drive circuit 11 outputs the low-level signal, the output end co1 of the control circuit 12 outputs a high-level signal. In this case, the power transistor M1 and the power transistor M2 are turned on, the power transistor M3 and the power transistor M4 are turned off, and the transistor N1 and the transistor N2 are turned off.

The timing shown in the time period t1 to the time period t5 is repeatedly executed, so that the switching power supply circuit 100 may provide stable electric energy for the load by using the inductor L and the capacitor C.

Based on the structure of the switching power supply circuit 100 shown in FIG. 3 and the timing that is shown in FIG. 4 and that is used to drive the power transistors and transistors in the switching power supply circuit 100 to work, in some scenarios, in the time period t5, if the power transistor M4 is not turned off in time and is still in a weak conduction state at the moment when the power transistor M1 is turned on, there is a penetration current from the power transistor M1 to the power transistor M4 at the moment when the power transistor M1 is turned on. The penetration current is usually relatively high, and is prone to damage a power transistor. To quickly switch the power transistor M4 from the weak on state to a cut-off state at the moment when the power transistor M1 is turned on, to prevent the power transistor M1 and the power transistor M4 from being simultaneously turned on, in an optional implementation of this embodiment of this disclosure, based on the structure of the switching power supply circuit 100 shown in FIG. 3, the switching power supply circuit 100 further includes the transistor N3. A gate of the transistor N3 is coupled to the source of the power transistor M3, a first electrode of the transistor N3 is coupled to the gate of the power transistor M4, and a second electrode of the transistor N3 is coupled to the ground Gnd by using a switch. The switch can be considered as a variety of switches, and the switch shown in FIG. 3 is a transistor N4. A first electrode of the transistor N4 is coupled to the second electrode of the transistor N3, and a second electrode of the transistor N4 is coupled to the ground Gnd. FIG. 3 further schematically shows that both the transistor N3 and the transistor N4 are NMOS transistors. The first electrode of the transistor N3 and the first electrode of the transistor N4 are drains, and the second electrode of the transistor N3 and the second electrode of the transistor N4 are sources. In addition to being coupled to the gate of the transistor N2, the output end co1 of the control circuit 12 is further coupled to a gate of the transistor N4, to control turn-on or turn-off of the transistor N4.

After the transistor N3 and the transistor N4 are added to the switching power supply circuit 100 shown in FIG. 3, in the time period t4 shown in FIG. 4, when the output end do2 of the drive circuit 11 outputs a low-level signal, the control circuit 12 controls the transistor N4 to be turned on in addition to controlling the transistor N2 to be turned on. In this case, the source of the power transistor M3 is coupled to the ground Gnd by using the transistor N4. In this case, the power transistor M4 is in the weak on state, and a drain voltage of the power transistor M4 is the source-drain voltage when the power transistor M4 is in the weak on state. The voltage is usually low, and it is difficult to trigger the transistor N3 to be turned on. In this time period, the transistor N3 is cut off. In the time period t5 shown in FIG. 4, after the power transistor M1 is turned on, the charges input from the power supply end Vcc are transmitted to the source of the power transistor M3 by using the power transistor M1, the power transistor M2, and the power transistor M3, and then is provided by the source of the power transistor M3 to the gate of the transistor N3. A source of the transistor N3 is coupled to the ground Gnd by using the transistor N4, so that a gate voltage of the transistor N3 is far higher than a source voltage, and the transistor N3 is turned on. In this way, the charges of the gate of the power transistor M4 are discharged to the ground Gnd by using the transistor N3 and the transistor N4, so that the gate potential of the power transistor M4 is rapidly reduced to the ground Gnd, and the power transistor M4 is quickly cut off. It may be learned from the timing shown in FIG. 4 that, after the power transistor M4 is turned on for a preset time period, the output end co1 of the control circuit 12 outputs a low-level signal. That is, the transistor N2 and the transistor N4 are controlled to be turned off. In conclusion, it may be learned that in this embodiment of this disclosure, the transistor N3 and the switch (the transistor N4 in FIG. 5) that is configured to connect the transistor N3 to the ground Gnd or disconnect the transistor N3 from the ground Gnd are disposed, so that in the time period t4, the control circuit 12 turns on the switch in advance. Therefore, at the moment when the power transistor M1 is turned on in the time period t5, the charges may be discharged to the gate of the transistor N3, to control the transistor N3 to be quickly turned on. In this way, the charges on the power transistor M4 are quickly discharged to the ground, so that the power transistor M4 in the weak on state is quickly cut off. This avoids breakdown and damage of a power transistor that are caused by punch-through of the power transistor M1 to the power transistor M4 at the moment when the power transistor M1 is turned on. In this way, the reliability of the switching power supply circuit 100 is improved.

Figure 5:
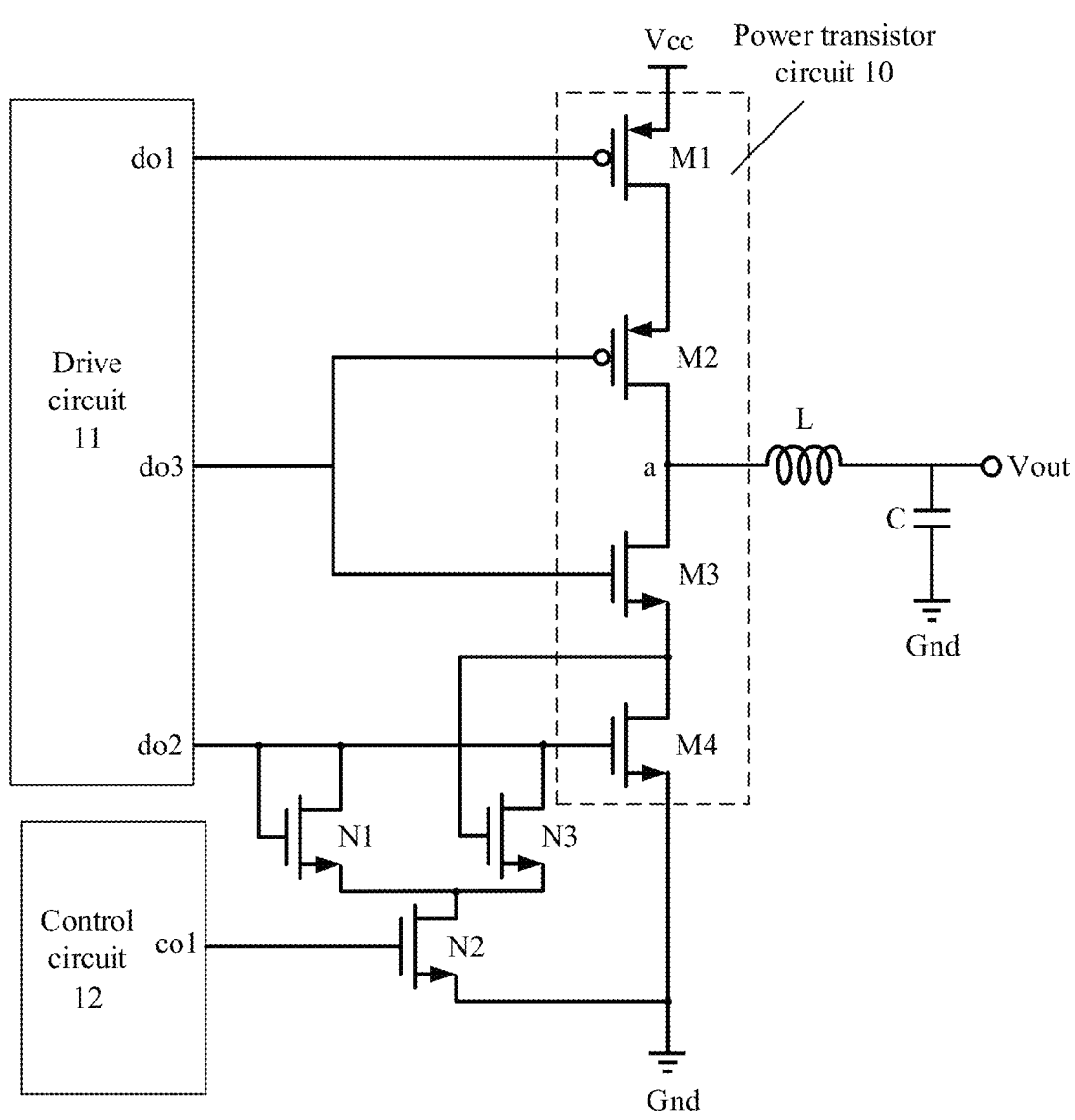
FIG. 5 is a schematic of another structure of a switching power supply circuit according to an embodiment of this disclosure.

In the switching power supply circuit 100 shown in FIG. 3, the four transistors N1 to N4 are disposed. In another possible implementation, only one switch may be disposed in the switching power supply circuit 100. That is, both the transistor N1 and the transistor N3 are coupled to the ground Gnd by using a same switch, as shown in FIG. 5. Similarly, the circuit structure may also be implemented within the dead time of switching from turning on the power transistor M4 to turning on the power transistor M1, so that the power transistor M4 is controlled to be in the weak on state, and the power transistor M4 is quickly cut off after the power transistor M1 is turned on. In comparison with the switching power supply circuit 100 shown in FIG. 3, the switching power supply circuit 100 shown in FIG. 5 is not provided with the transistor N4 that is used as a switch. Both the source of the transistor N1 and the source of the transistor N3 are coupled to a drain of the transistor N2, and are coupled to the ground Gnd by using the transistor N2 that is used as a switch. A structure of other components in FIG. 5, a connection relationship between the components, and a working principle of the switching power supply circuit 100 are the same as those of the switching power supply circuit 100 shown in FIG. 3. For details, refer to related descriptions. Details are not described again.

Figure 6:
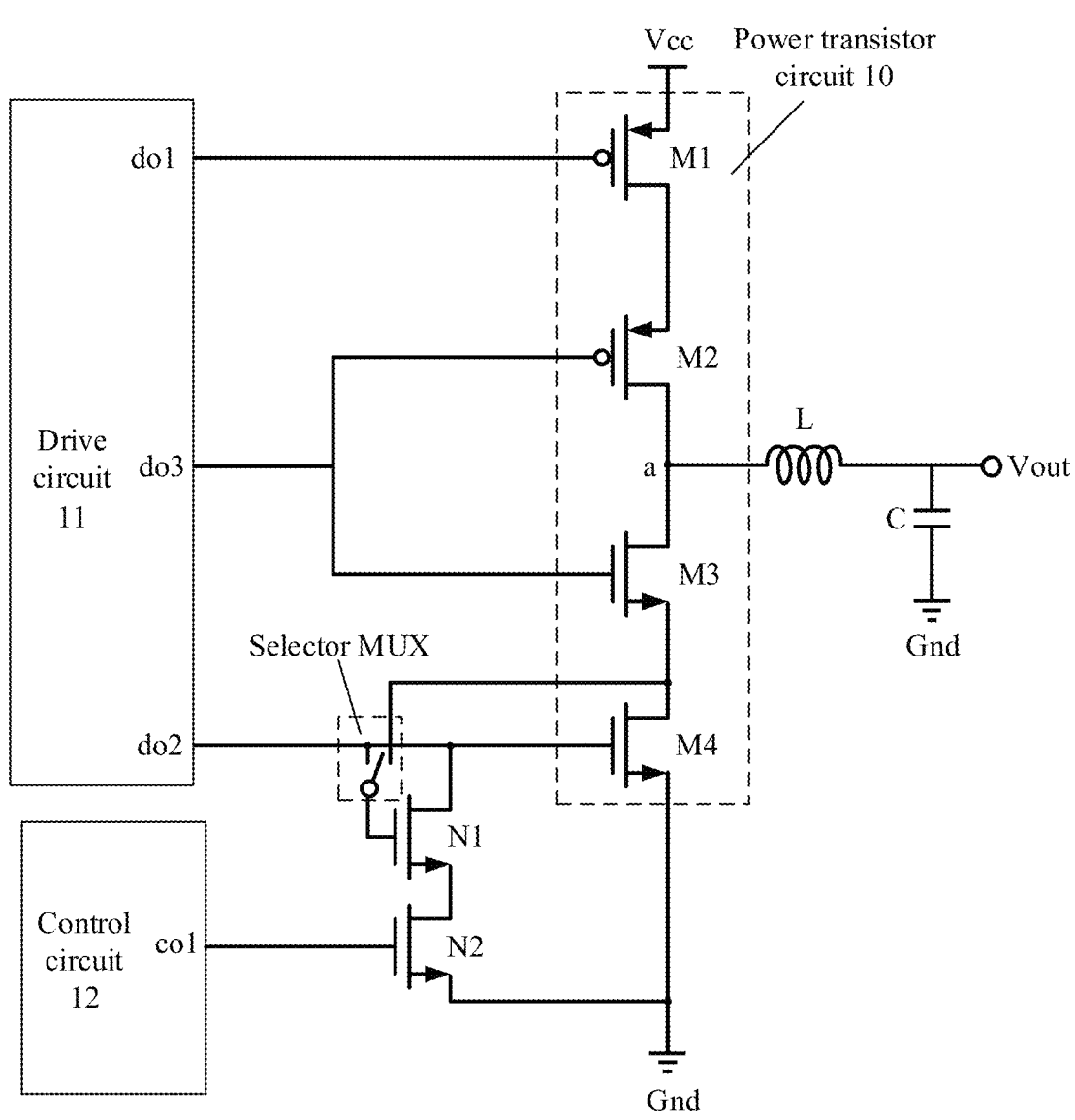
FIG. 6 is a schematic of still another structure of a switching power supply circuit according to an embodiment of this disclosure.

In the switching power supply circuit 100 shown in FIG. 3 and the switching power supply circuit 100 shown in FIG. 5, the transistors N1 to N3 are disposed. In another possible implementation, only the transistor N1 and the transistor N2 may be disposed in the switching power supply circuit 100, and the transistor N3 is not disposed. In addition, a selector MUX may be further disposed in the switching power supply circuit 100. The selector MUX may be a one-of-two selector, as shown in FIG. 6. Similarly, the circuit structure may also be implemented within the dead time of switching from turning on the power transistor M4 to turning on the power transistor M1, so that the power transistor M4 is controlled to be in the weak on state, and the power transistor M4 is quickly cut off after the power transistor M1 is turned on. In FIG. 6, the gate of the transistor N1 is coupled to an input end of the selector MUX, one output end of the selector MUX is coupled to the gate of the power transistor M4, and another output end of the selector MUX is coupled to a drain of the power transistor M4. A structure of other components in FIG. 6 and a connection relationship between the components are the same as those of the switching power supply circuit 100 shown in FIG. 5. For details, refer to related descriptions. In specific working, at a start moment of the time period t4 shown in FIG. 4, the selector MUX connects the gate of the transistor N1 to the gate of the power transistor M4; and at an end moment of the time period t4 and a start moment of the time period t5 shown in FIG. 4, the selector MUX connects the gate of the transistor N1 to the drain of the power transistor M4.

Figure 7:
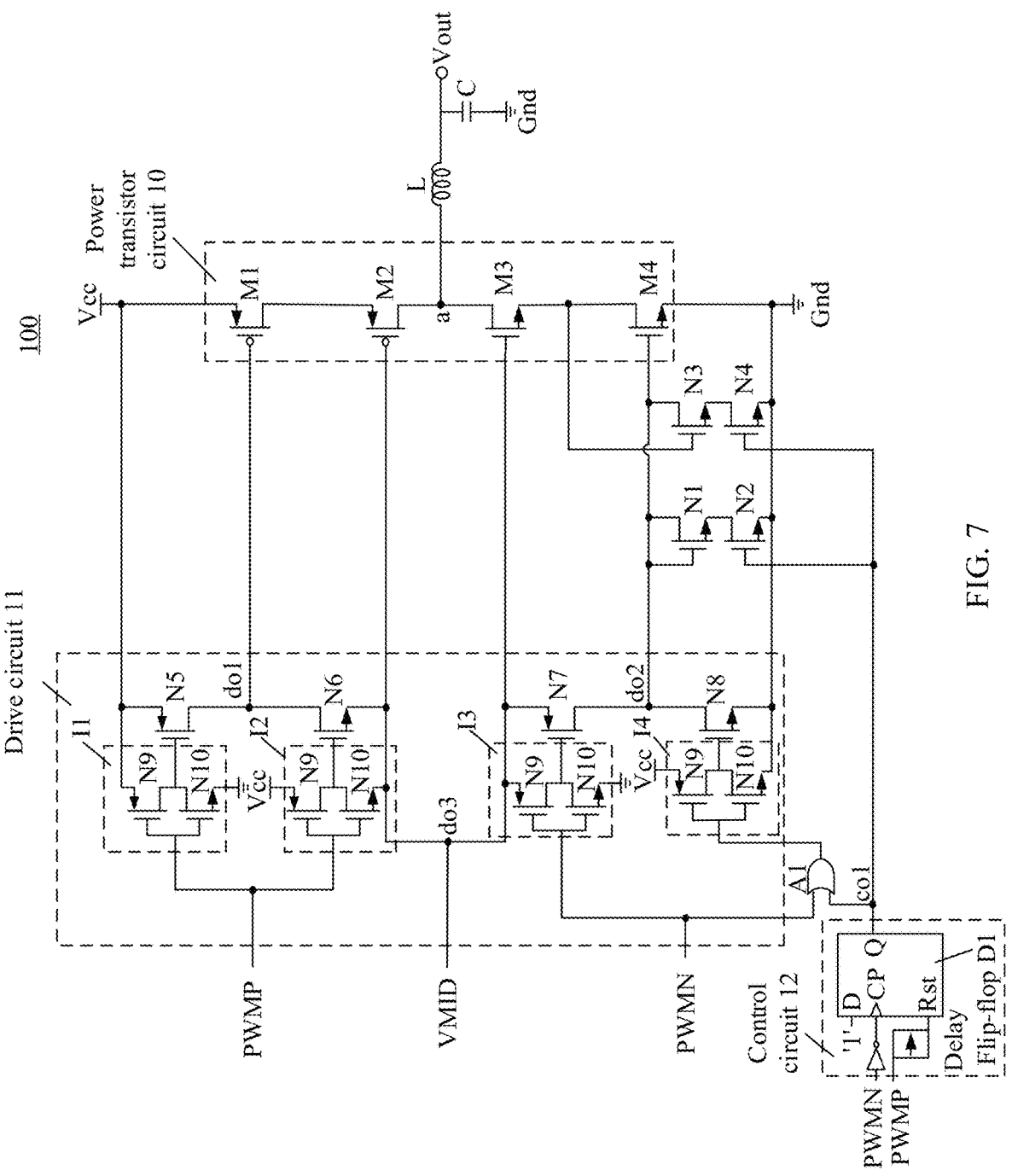
FIG. 7 is a schematic of a specific structure of the switching power supply circuit shown in FIG. 3 according to an embodiment of this disclosure.

Based on the switching power supply circuit 100 shown in FIG. 3, FIG. 5, and FIG. 6, a structure of the control circuit 12 provided in this embodiment of this disclosure is shown in FIG. 7. In FIG. 7, the control circuit 12 includes a flip-flop D1. The flip-flop D1 may be a D flip-flop. A clock signal end CP of the flip-flop D1 is configured to input a signal obtained after a phase of the PWMN signal is inverted. The PWMN signal is used to control the power transistor M4 to be turned on or turned off. During specific implementation, timing of the PWMN signal may be the same as that of the drive signal DO2 shown in FIG. 4. A reset end Rst of the flip-flop D1 is configured to input a delayed signal of the PWMP signal. The PWMP signal is used to control the power transistor M1 to be turned on or turned off. During specific implementation, timing of the PWMP signal may be the same as that of the drive signal DO1 shown in FIG. 4. Both the PWMN signal and the PWMP signal are PWM signals output by another component (for example, a processor, a signal generator, or a controller). An output end Q of the flip-flop D1 is the output end co1 of the control circuit 12, and is coupled to the gate of the transistor N2 and the gate of the transistor N4, to output a control signal, to control the transistor N2 and the transistor N4 to be turned on or turned off. In this embodiment of this disclosure, the transistor N2 and the transistor N4 are schematically NMOS transistors, and the NMOS transistor is turned on when there is a high-level signal at a gate of the NMOS transistor. In this case, when the clock signal end CP of the flip-flop jumps from a low level to a high level, an input end D of the flip-flop D1 inputs a high-level signal, to be specific, "logic 1" shown in FIG. 7. The reset end Rst is valid when a signal jumps from a high level to a low level. Based on the flip-flop D1 shown in FIG. 7, in the time period t1, the time period t2, and the time period t3 shown in FIG. 4, the flip-flop D1 outputs a low-level signal, and the transistor N2 and the transistor N4 are turned off. In the time period t4 shown in FIG. 4, a signal input from the clock signal end CP of the flip-flop D1 jumps from a low level to a high level. In this case, the flip-flop D1 is turned on, and the flip-flop D1 transmits the high-level signal input from the input end D to the output end Q, to control the transistor N2 and the transistor N4 to be turned on. In the time period t5 shown in FIG. 4, the PWMP signal (the specific timing is the same as that of the signal output by the output end do1 of the drive circuit 11) jumps from a high level to a low level, and the signal is provided to the reset end Rst of the flip-flop D1 after a delay. Therefore, the signal received by the reset end Rst jumps from a high level to a low level, and the output end Q of the flip-flop D1 outputs a low-level signal, to control the transistor N2 and the transistor N4 to be turned off.

Based on the switching power supply circuit 100 shown in FIG. 3, FIG. 5, and FIG. 6, still refer to FIG. 7, FIG. 7 further shows a schematic of a structure of the drive circuit 11 according to an embodiment of this disclosure. The drive circuit 11 may include an inverter I1 to an inverter I4, and a transistor N5 to a transistor N8. The inverter I1 to the inverter I4 may be CMOS inverters shown in FIG. 7, and each inverter includes a PMOS-type transistor N9 and an NMOS-type transistor N10. In the inverter I1, a source of the transistor N9 is coupled to the power supply end Vcc, both a drain of the transistor N9 and a drain of the transistor N10 are coupled to a gate of the transistor N5, and a source of the transistor N10 is coupled to the ground Gnd. In the inverter I2, a source of the transistor N9 is coupled to the power supply end Vcc, both a drain of the transistor N9 and a drain of the transistor N10 are coupled to a gate of the transistor N6, and a source of the transistor N10 is coupled to the gate of the power transistor M2. In the inverter I3, a source of the transistor N9 is coupled to the gate of the power transistor M3, both a drain of the transistor N9 and a drain of the transistor N10 are coupled to a gate of the transistor N7, and a source of the transistor N10 is coupled to the ground Gnd. In the inverter I4, a source of the transistor N9 is coupled to the power supply end Vcc, both a drain of the transistor N9 and a drain of the transistor N10 are coupled to a gate of the transistor N8, and a source of the transistor N10 is coupled to the ground Gnd. The transistor N5 and the transistor N6 are different types of transistors, and the transistor N7 and the transistor N8 are different types of transistors. FIG. 7 schematically shows that the transistor N5 and the transistor N7 are PMOS-type transistors, and the transistor N6 and the transistor N8 are NMOS-type transistors. A source of the transistor N5 is coupled to the power supply end Vcc, a drain of the transistor N5 and a drain of the transistor N6 are coupled to the gate of the power transistor M1, a source of the transistor N6 is coupled to the gate of the power transistor M2, a source of the transistor N7 is coupled to the gate of the power transistor M3, both a drain of the transistor N7 and a drain of the transistor N8 are coupled to the gate of the power transistor M4, and a source of the transistor N8 is coupled to the ground Gnd. In addition, as shown in FIG. 7, a gate of the transistor N9 and a gate of the transistor N10 in the inverter I1, and a gate of the transistor N9 and a gate of the transistor N10 in the inverter I2 are all configured to input a PWMP signal; and a gate of the transistor N9 and a gate of the transistor N10 in the inverter I3 are configured to input a PWMN signal. In addition, the switching power supply circuit 100 further includes an OR gate A1. One input end of the OR gate A1 is configured to input the PWMN signal, another input end of the OR gate A1 is coupled to the output end Q of the flip-flop D1, and an output end of the OR gate A1 is coupled to a gate of the transistor N9 and a gate of the transistor N10 in the inverter I4. Therefore, the PWMN signal is provided to the gate of the transistor N9 and the gate of the transistor N10 in the inverter I4 after an OR operation is performed on the PWMN signal and the output end Q of the flip-flop D1.

Figure 8:
FIG. 8 is a schematic of yet another structure of a switching power supply circuit according to an embodiment of this disclosure.

In the switching power supply circuit 100 shown in FIG. 3, FIG. 5, FIG. 6, and FIG. 7, the transistor N1 and the transistor N2 are disposed, and the transistor N3, the selector MUX, or the transistor N4 is selectively disposed, so that the power transistor M4 is controlled to be in the weak on state within the dead time of switching from turning on the power transistor M4 to turning on the power transistor M1. This avoids breakdown and damage of the power transistor M3 that are caused by an excessively high gate-source voltage and an excessively high gate-drain voltage of the power transistor M3. After the power transistor M1 is turned on, the power transistor M4 is quickly cut off, to avoid breakdown and damage of a power transistor that are caused by punch-through of the power transistor M1 to the power transistor M4 at the moment when the power transistor M1 is turned on. However, within the dead time of switching from turning on the power transistor M1 to turning on the power transistor M4, a current loop is formed between the inductor L, the capacitor C, the ground Gnd, the body diode on the power transistor M4, and the power transistor M3. That is, a case in which the power transistor M3 is broken down and damaged due to the excessively high gate-source voltage and gate-drain voltage of the power transistor M3 also exists. Based on this, in an optional implementation of this embodiment of this disclosure, on the basis of the switching power supply circuit 100 shown in any embodiment of FIG. 3, FIG. 5, and FIG. 6, the switching power supply circuit 100 further includes a transistor N11 and an AND gate A2, as shown in FIG. 8. FIG. 8 shows a case in which the transistor N11 and the AND gate A2 are further included on the basis of the structure of the switching power supply circuit 100 shown in FIG. 3. The transistor N11 and the transistor N1 are different types of transistors. FIG. 8 schematically shows a case in which the transistor N11 is a PMOS transistor. A source of the transistor N11 is coupled to the gate of the power transistor M3, and a drain of the transistor N11 is coupled to the gate of the power transistor M4. In addition, the control circuit 12 further includes an output end co2 in addition to the output end co1. The output end co2 of the control circuit is coupled to a gate of the transistor N11 by using an inverter. In addition, the output end co1 and the output end co2 of the control circuit are coupled to the gate of the transistor N2 by using the OR gate A2. In addition, a structure of the remaining components and a connection relationship between the components shown in FIG. 8 are the same as a structure of the components and a connection relationship between the components in the switching power supply circuit 100 shown in FIG. 5. Details are not described again.

Figure 9:
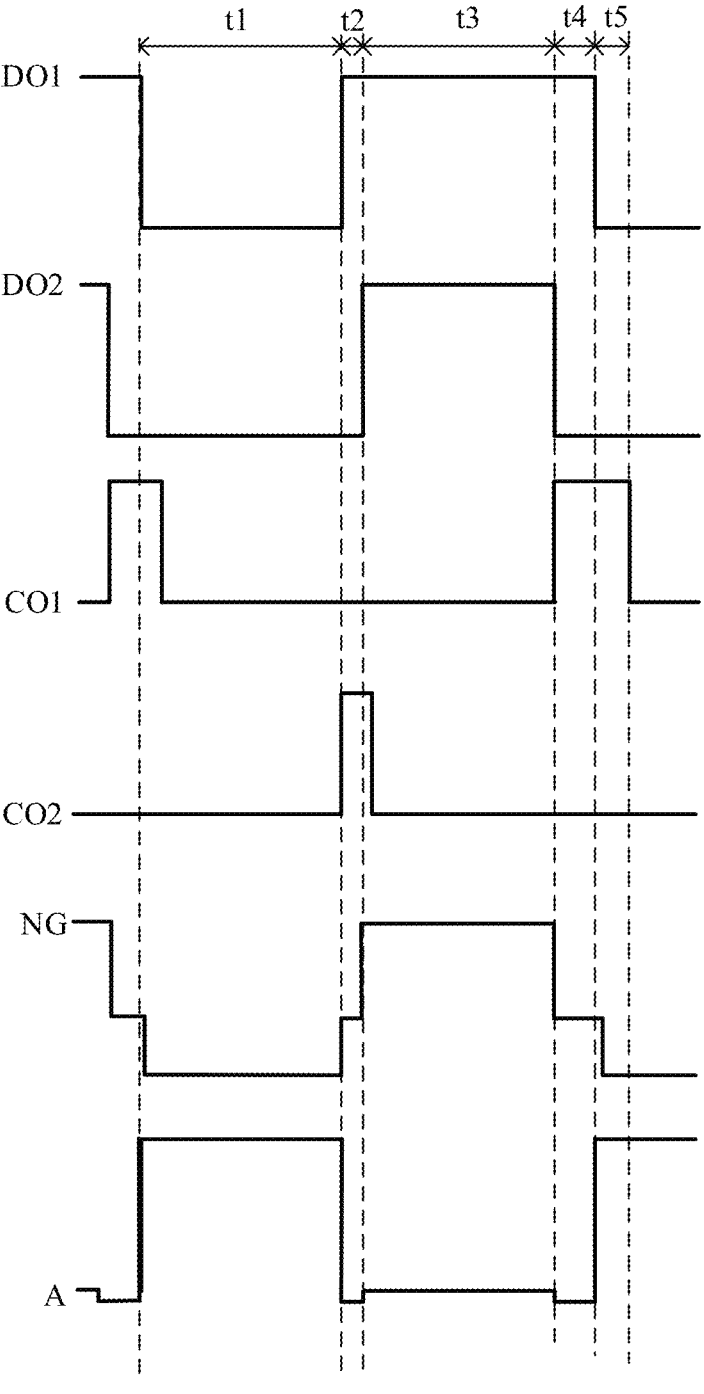
FIG. 9 is a diagram of timing for driving the switching power supply circuit shown in FIG. 8 according to an embodiment of this disclosure.

Based on the structure of the switching power supply circuit 100 shown in FIG. 8, still refer to FIG. 9. FIG. 9 is a drive timing of the switching power supply circuit 100 shown in FIG. 8. The drive timing shown in FIG. 9 further includes timing of a control signal CO2 in addition to timing of the drive signal DO1, the drive signal DO2, the control signal CO1, the signal NG, and the signal A. The following describes a working principle of the switching power supply circuit 100 shown in FIG. 8 with reference to the structure of the switching power supply circuit 100 shown in FIG. 8 and the drive timing shown in FIG. 9.

In a time period t1, the drive signal DO1, the drive signal DO2, the control signal CO1, the signal NG, and the signal A are the same as the drive signal DO1, the drive signal DO2, the control signal CO1, the signal NG, and the signal A shown in FIG. 4, the control signal CO2 is a low-level signal, and the transistor N11 is turned off. Therefore, in this time period, a working manner of the switching power supply circuit 100 shown in FIG. 8 is the same as that of the switching power supply circuit 100 shown in FIG. 3. For details, refer to related descriptions. Details are not described again.

In a time period t2, the drive signal DO1, the drive signal DO2, and the control signal CO1 are the same as the drive signal DO1, the drive signal DO2, and the control signal CO1 shown in FIG. 4. In addition, the output end co2 of the control circuit 12 outputs a high-level signal. That is, the control signal CO2 is a high-level signal. In this case, the power transistor M1 and the power transistor M2 are turned off, the power transistor M3 is turned on, the transistor N2 and the transistor N11 are turned on, and the source of the transistor N1 is connected to the ground Gnd by using the transistor N2. The gate of the power transistor M4 is clamped to the gate-source voltage Vgs of the transistor N1. That is, in this case, the gate potential of the power transistor M4 is Vgs higher than a source potential, so that the power transistor M4 enters the weak on state. Charges on the inductor L and the capacitor C form a closed loop between the ground Gnd, the conduction channel of the weakly conductive power transistor M4, and the power transistor M3. The gate-source voltage and the gate-drain voltage of the power transistor M3 are a sum of $\frac{1}{2}$ Vcc and the source-drain voltage of the power transistor M4. Therefore, in this embodiment of this disclosure, the transistor N11 is disposed, so that in the time period t2, namely, the dead time of switching from turning on the power transistor M1 to turning on the power transistor M4, the charges discharged by the inductor L and the capacitor C may be prevented from flowing to the source and the drain of the power transistor M3 by using the body diode on the power transistor M4. This avoids breakdown and damage of the power transistor M3 that are caused by an excessively high gate-source voltage and an excessively high gate-drain voltage of the power transistor M3. In this way, the reliability of the switching power supply circuit 100 is improved. It may be learned from FIG. 9 that, in this time period, the gate potential (that is, the signal NG) of the power transistor M4 is raised to the gate-source voltage Vgs of the transistor N1, and a potential (that is, the signal A) of the output node a is also raised.

In a time period t3, the drive signal DO1, the drive signal DO2, and the control signal CO1 are the same as the drive signal DO1, the drive signal DO2, and the control signal CO1 shown in FIG. 4. In addition, after the output end do2 of the drive circuit 11 outputs a high-level signal, the output end co2 of the control circuit 12 outputs a low-level signal (that is, the control signal CO2 jumps from a high level to a low level after a delay). In this case, the power transistor M1 and the power transistor M2 are turned off, the power transistor M3 and the power transistor M4 are turned on, the transistor N1 to the transistor N4 and the transistor N11 are all turned off, the drive circuit 11 provides a high-level signal to the gate of the power transistor M3, and the power transistor M3 is completely turned on. Therefore, charges stored by the inductor L and the capacitor C in the time period t1 form a closed loop by using the ground Gnd, the power transistor M3, and the power transistor M4, to supply power to the load.

In a time period t4 to a time period t5, the drive signal DO1, the drive signal DO2, the control signal CO1, the signal NG, and the signal A are the same as the drive signal DO1, the drive signal DO2, the control signal CO1, the signal NG, and the signal A shown in FIG. 4, the control signal CO2 is a low-level signal, and the transistor N11 is turned off. Therefore, in this time period, a working manner of the switching power supply circuit 100 shown in FIG. 8 is the same as that of the switching power supply circuit 100 shown in FIG. 3 and FIG. 5. For details, refer to related descriptions. Details are not described again.

When the timing shown in the time period t1 to the time period t5 is repeatedly executed, the switching power supply circuit 100 shown in FIG. 8 may provide stable electric energy for the load by using the inductor L and the capacitor C.

Figure 10:
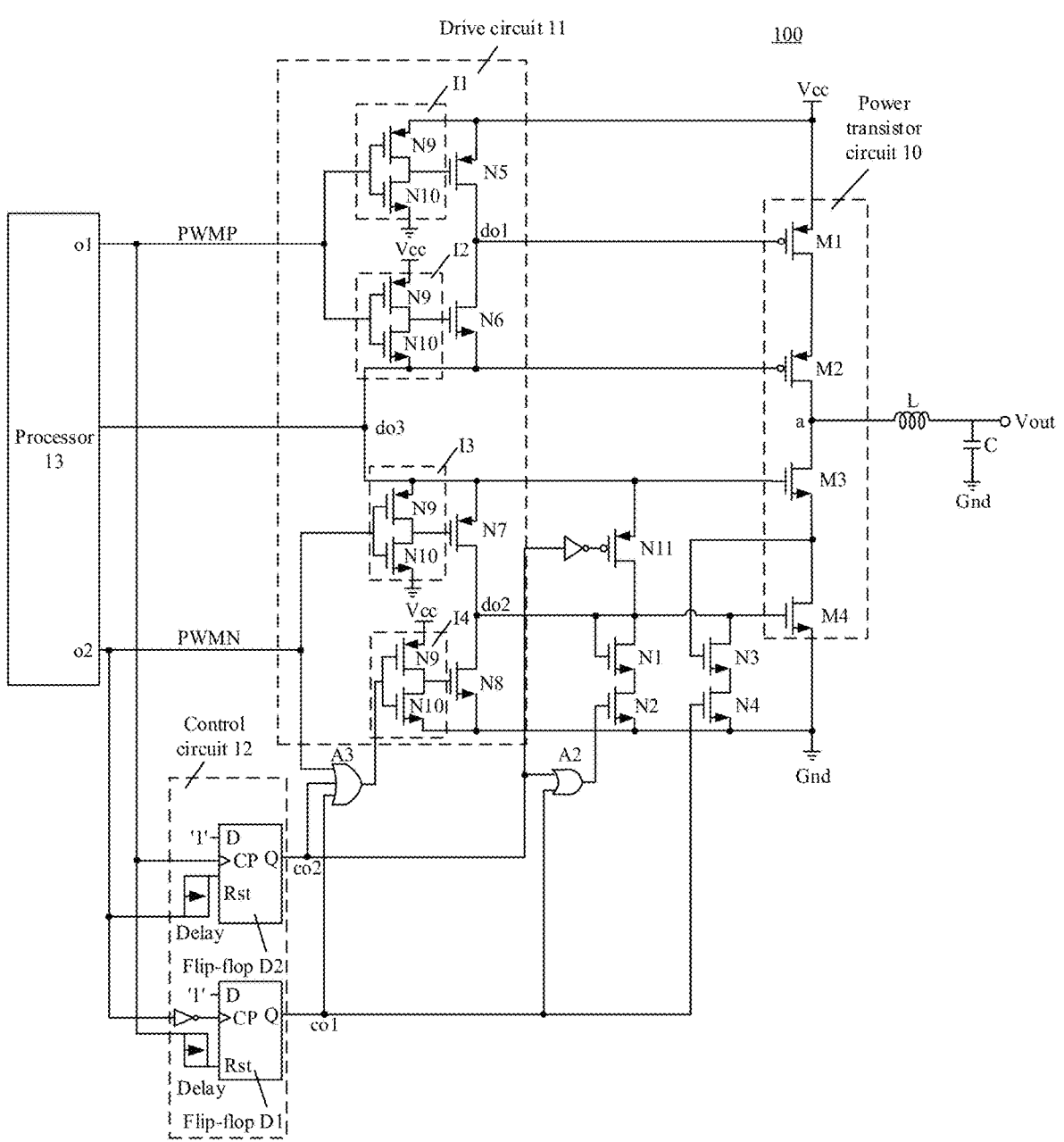
FIG. 10 is a schematic of a specific structure of the switching power supply circuit shown in FIG. 9 according to an embodiment of this disclosure.

Based on the switching power supply circuit 100 shown in FIG. 8, in a possible implementation, the control circuit 12 further includes a flip-flop D2. The flip-flop D2 may be a D flip-flop. The flip-flop D2 is configured to: control, within the dead time of switching from turning on the power transistor M1 to turning on the power transistor M4, the transistor N2 and the transistor N11 to be turned on, and control the transistor N2 and the transistor N11 to be turned off after the output end do2 of the drive circuit 11 outputs a high-level signal, as shown in FIG. 10. In FIG. 10, based on the structure of the switching power supply circuit 100 shown in FIG. 7, the control circuit 12 further includes the flip-flop D2. A clock signal end CP of the flip-flop D2 is configured to input a PWMP signal, and a reset end Rst of the flip-flop D2 is configured to input a delayed PWMN signal. The PWMP signal and the PWMN signal shown in FIG. 10 are the same as the PWMP signal and the PWMN signal shown in FIG. 7. An output end Q of the flip-flop D2 is the output end co2 of the control circuit 12, and the output end co2 is coupled to the gate of the transistor N11 by using an inverter. In addition, the output end Q of the flip-flop D1 and the output end Q of the flip-flop D2 are coupled to the gate of the transistor N2 by using the AND gate A2. In addition, a three-input OR gate A3 is further included in FIG. 10. The output end Q of the flip-flop D1 and the output end Q of the flip-flop D2 are respectively connected to two input ends of the OR gate A3, and another input end of the OR gate A3 is configured to input the PWMN signal. When the clock signal end CP of the flip-flop D2 jumps from a low level to a high level, an input end D of the flip-flop D2 inputs a high-level signal, to be specific, "logic 1" shown in FIG. 10. The reset end Rst is valid when a signal jumps from a low level to a high level. Based on the flip-flop D2 shown in FIG. 10, in the time period t1 shown in FIG. 9, the flip-flop D2 outputs a low-level signal, and the transistor N2 and the transistor N11 are turned off. In the time period t2 shown in FIG. 10, a signal input from the clock signal end CP of the flip-flop D2 jumps from a low level to a high level. In this case, the flip-flop D2 is turned on, and the flip-flop D2 transmits a high-level signal input from the input end D to the output end Q, to control the transistor N2 and the transistor N11 to be turned on. In the time period t3 shown in FIG. 10, a signal input from the reset end Rst of the flip-flop D2 jumps from a low level to a high level, the output end Q of the flip-flop D2 outputs a low-level signal, and the transistor N2 and the transistor N11 are turned off. In the time period t4 and the time period t5 shown in FIG. 10, the output end Q of the flip-flop D2 outputs a low-level signal. In the two time periods, the flip-flop D1 works.

Further, based on the switching power supply circuit 100 shown in FIG. 10, the switching power supply circuit 100 in this embodiment of this disclosure further includes a processor 13. The processor 13 may be various digital logic devices or circuits, including but not limited to a central processing unit, a microcontroller, a microprocessor, a digital signal processor (DSP), or the like. An output end o1 of the processor 13 is coupled to the gate of the transistor N9 and the gate of the transistor N10 in the inverter I1 and the gate of the transistor N9 and the gate of the transistor N10 in the inverter I2, to output a PWMP signal to the gates of the coupled transistors. An output end o2 of the processor 13 is coupled to the gate of the transistor N9 and the gate of the transistor N10 in the inverter I3, to output a PWMN signal to the gates of the coupled transistors. In addition, the output end o2 of the processor 13, the output end Q of the flip-flop D1, and the output end Q of the flip-flop D2 are respectively coupled to the input ends of the OR gate A3, and an output end of the OR gate A3 is coupled to the gate of the transistor N9 and the gate of the transistor N10 in the inverter I4. The OR gate A3 performs an OR operation on the control signal CO1, the control signal CO2, and the PWMN signal to generate a control signal, to control the transistor N9 and the transistor N10 in the inverter I4 to be turned on or turned off.

Finally, it should be noted that the foregoing embodiments are merely intended for describing the technical solutions of this disclosure other than limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this disclosure.

What is claimed is:

1. A switching power supply circuit comprising:
   a power transistor circuit comprising a plurality of power transistors configured to couple in series between a power supply end and a ground, wherein the power transistors comprise:
       a first power transistor comprising:
           a first electrode;
           a second electrode; and
           a first gate;
       a second power transistor configured to couple to the power supply end using the first electrode; and
       a third power transistor coupled to the second electrode and comprising a second gate, wherein the third power transistor is configured to couple the second electrode to the ground;
   a drive circuit configured to:
       receive a pulse-width modulation (PWM) signal;
       generate a drive signal based on the PWM signal to drive the second power transistor and the third power transistor; and
       maintain the first gate at a preset voltage;
   a first switch;
   a first transistor comprising:
       a third gate coupled to the first gate;
       a third electrode coupled to the second gate; and
       a fourth electrode configured to couple the first switch to the ground; and
   a control circuit configured to:
       receive the PWM signal; and
       generate a first control signal based on the PWM signal to control the first switch.

2. The switching power supply circuit according to claim 1, comprising:
   a second switch; and
   a second transistor comprising:
       a fourth gate coupled to the second electrode;
       a fifth electrode coupled to the second gate; and
       a sixth electrode configured to couple the second switch to the ground.

3. The switching power supply circuit according to claim 2, wherein the control circuit is further configured to: control the second switch using the first control signal.

4. The switching power supply circuit according to claim 1, wherein the switching power supply circuit further comprises a selector configured to selectively couple the first gate to the second gate or the second electrode.

5. The switching power supply circuit according to claim 1, wherein the PWM signal includes a first PWM signal for controlling the second power transistor and a second PWM signal for controlling the third power transistor, and wherein the control circuit comprises a first flip-flop configured to generate the first control signal based on the first PWM signal and the second PWM signal.

6. The switching power supply circuit according to claim 5, further comprising a second transistor, wherein the second transistor and the first transistor are different types of transistors, and wherein the second transistor comprises:
   a fifth electrode coupled to the first gate; and
   a sixth electrode coupled to the first electrode.

7. The switching power supply circuit according to claim 6, wherein the control circuit is further configured to generate a second control signal based on the PWM signal to control the third second transistor.

8. The switching power supply circuit according to claim 7, wherein the control circuit further comprises a second flip-flop configured to generate the second control signal based on the first PWM signal and the second PWM signal.

9. The switching power supply circuit according to claim 7, further comprising an OR gate configured to:

perform an OR operation on the first control signal and the second control signal; and generate, after performing the OR operation a third control signal to control the first switch.

10. The switching power supply circuit according to claim 7, comprising an OR gate configured to:

perform an OR operation on the first control signal, the second control signal, and the second PWM signal;

generate, after performing the OR operation a third control signal; and provide the third control signal to the drive circuit.

11. The switching power supply circuit according to claim 2, wherein the control circuit is specifically further configured to:

control, within a time of switching from turning on the third power transistor to turning on the second power transistor, the first switch and the second switch to turn on; and control, after turning on the second power transistor, the first switch and the second switch to off.

12. The switching power supply circuit according to claim 6, wherein the control circuit is further configured to:

control, within a time of switching from turning on the second power transistor to turning on the third power transistor, the second transistor and the first switch to turn on; and control, after turning on the third power transistor, the second transistor and the first switch to off.

13. The switching power supply circuit according to claim 1, wherein the power transistors further comprise a fourth power transistor comprising a fourth gate, wherein the first electrode is coupled to the second power transistor and the fourth power transistor and configured to couple the power supply end to the second power transistor and the fourth power transistor, and wherein the drive circuit is further configured to maintain the fourth gate at the preset voltage.

14. The switching power supply circuit according to claim 10, further comprising a processor configured to generate the first PWM signal and the second PWM signal.

15. The switching power supply circuit according to claim 14, wherein the drive circuit comprises:

a first inverter comprising:

a first input end configured to receive the second PWM signal;

a first output end;

a second inverter comprising:

a second input end configured to receive the third control signal; and a second output end;

a fourth transistor that is a p-channel metal-oxide semiconductor (PMOS) transistor and comprising:

a fourth gate coupled to the first output end, a first source coupled to the first gate; and a first drain; and a fifth transistor that is an n-channel metal-oxide semiconductor (NMOS) transistor and comprising:

a fifth gate coupled to the second output end;

a second source configured to couple to the ground; and a second drain coupled to the first drain.

16. The switching power supply circuit according to claim 1, further comprising:

an inductor comprising:

a first end coupled to the first electrode; and a second end configured to couple to a load to supply power to the load; and a capacitor comprising:

a fifth electrode coupled to the second end; and a sixth electrode configured to couple to the ground.

17. An electronic device, wherein the electronic device comprising:

a load; and a switching power supply circuit comprising:

an output end coupled to the load and configured to supply power to the load; and a power transistor circuit comprising: a plurality of power transistors configured to couple in series between a power supply end and a ground, wherein the power transistors comprise:

a first power transistor comprising:

a first electrode;

a second electrode; and a first gate;

a second power transistor configured to couple the first electrode to the power supply end; and a third power transistor coupled to the second electrode and comprising a second gate, wherein the third power transistor is configured to couple to the second electrode to the ground;

a drive circuit configured to:

receive a pulse width modulation (PWM) signal;

generate a drive signal based on the PWM signal to drive the second power transistor and the third power transistor; and maintain the first gate at a preset voltage;

a first switch;

a first transistor comprising:

a third gate coupled to the first gate;

a third electrode coupled to the second gate; and a fourth electrode coupled to the first switch and configured to the ground; and a control circuit configured to:

receive the PWM signal; and generate a first control signal based on the PWM signal to control the first switch.

18. The electronic device according to claim 17, wherein the switching power supply circuit further comprises:

a second switch; and a second transistor comprising:

a fourth gate coupled to the second electrode;

a fifth electrode coupled to the second gate; and a sixth electrode configured to couple the second switch to the ground, and wherein the control circuit is further configured to control the second switch using the first control signal.

19. The electronic device according to claim 17, wherein the switching power supply circuit further comprises a selector configured to selectively couple the first gate to the second gate or the second electrode.

20. The electronic device according to claim 17, wherein the PWM signal comprises:

a first PWM signal for controlling the second power transistor; and a second PWM signal for controlling the third power transistor, and wherein the control circuit comprises a first flip-flop configured to generate the first control signal based on the first PWM signal and the second PWM signal.

* * * * *